United States Patent [19]

Kesper

[11] Patent Number: 5,035,057

[45] Date of Patent: Jul. 30, 1991

[54] CHAIN GUIDE FOR POWER CHAIN SAWS

[76] Inventor: Heinrich Kesper, Sommerweg 26, 3501 Naumburg, Fed. Rep. of Germany

[21] Appl. No.: 492,606

[22] Filed: Mar. 12, 1990

[30] Foreign Application Priority Data

Mar. 11, 1989 [DE] Fed. Rep. of Germany ....... 3907812

[51] Int. Cl.[5] ....................... B23D 59/00; B23D 57/00; B23D 57/02; B26D 5/00

[52] U.S. Cl. ..................................... 30/383; 30/123.4; 30/381; 83/833

[58] Field of Search ................. 30/381, 382, 383, 386, 30/387, 393, 123.4; 83/830, 833

[56] References Cited

U.S. PATENT DOCUMENTS 3,323,561 6/1967 Lahtinen .............................. 30/383
4,257,162 3/1981 Pardon ................................ 30/382
4,722,141 2/1988 Lim et al. ............................ 30/381
4,796,502 1/1989 Anderson ............................. 83/833
4,887,357 12/1989 Alexander ............................ 83/830

FOREIGN PATENT DOCUMENTS 1045519 1/1979 Canada ................................ 30/123.4
0067485 12/1982 European Pat. Off. ............. 30/383

*Primary Examiner*—Douglas D. Watts
*Assistant Examiner*—Paul M. Heyrana, Sr.
*Attorney, Agent, or Firm*—Michael J. Striker

[57] ABSTRACT

A chain guiding rail for use in power chain saws has a tip part defining an arcuate run-in section extending from an end point of a forward-run section to the vertex of the tip part, and a run-out section extending from the vertex point to a start point of a return-run section. The run-out section has a substantially larger diameter and a tangential line at its center point forms an angle (b8) of 40° to 70° with a center axis of the rail. To eliminate kickbacks during operation of the chain saw the vertex is situated in a sector of the tip part which is delimited by reference line coinciding with the center axis or extending in parallel thereto, a perpendicular line relative to the forward-run section at the end point (E) and to the parallel reference line or the center axis, and an arc whose center of curvature coincides with the point of intersection of the parallel reference line with the perpendicular line.

26 Claims, 4 Drawing Sheets

CHAIN GUIDE FOR POWER CHAIN SAWS

BACKGROUND OF THE INVENTION

The present invention relates to a chain guide for a motor driven chain saw, the guide being in the form of an elongated rail defining a rear portion, an intermediate portion and a front portion, a longitudinal center axis and a peripheral surface for slidably supporting a saw chain, the rear portion being provided with attachment elements engageable with a holding fixture in a housing of the chain saw, the peripheral guiding surface defining a forward-run section extending in an upper part of the intermediate portion substantially parallel to the center axis and terminating at an end point, a return-run or cutting section extending from a start point in a lower part of the intermediate section substantially parallel to the center axis, and an arcuate tip section which includes a circular run-in section starting at the end point and terminating at a vertex point above the center axis, and a curved run-out section starting at the vertex point and terminating at the start point of the cutting section.

Recently it has been for the first time achieved to design a chain guide which is symmetrical relative to its center axis and which is shaped in such a manner that only by its geometric configuration the dangerous tendency to kick back inherent in all prior art power chain saws has been completely eliminated (DE-DM 88 03 810). This surprising advantage has been achieved by means of dimensioning the radius of curvature of the tip of the rail in the range of its vertex to amount 10 to 30 mm and to connect in this range with an end point of the forward-run section by a transmission section whose radius of curvature is at least 150 mm and which forms with the center axis of the rail an angle between 10° to 40°. However, this advantage of the complete elimination of the backstroke or kickback is accompanied with a significant disadvantage for practical operation, namely that during plunge-cutting operation the tip of the guide rail can be plunged into the wood only at the cost of a high power consumption.

From prior art (U.S. Pat. No. 3,323,561, DE-AS 15 03 968) guide rails of the above described type are known which in general have an asymmetric configuration relative to their center axes and are better suitable for the plunge-cutting operation. In particular, they have succeeded to eliminate vibrations or shaking motions of conventional chain saws which when using a symmetrical chain guide may lead even to the dislodging of the chain from the processed cut. In prior art asymmetric guide rails, however, there has been no possibility to eliminate kickbacks because the transfer of features of the known configuration of the guide rail design for avoiding the back stroke to the asymmetric guide rails would neutralize the achieved advantages of the latter as regards the plunge-cutting operation.

SUMMARY OF THE INVENTION

It is therefore a general object of the present invention to eliminate the disadvantages of the prior art chain guides.

In particular, it is an object of the invention to provide a chain guide of the above described kind whose specific asymmetric configuration of its tip portion enables the elimination of kickbacks similarly as in the symmetric rails. In addition the guide rail of the invention makes available chain saws with which plunge-cutting operations can be performed with a small power consumption and high cutting efficiency.

In keeping with these objects and others which will become apparent hereafter, one feature of this invention resides in shaping the arcuate tip section of the rail in such a manner that the center of curvature of the circular run-in section is a point of intersection of a perpendicular to the forward-run section at the end point thereof with a reference line extending parallel to the center axis below the vertex point, and the vertex point coinciding with a point of intersection of the run-in section with a line passing through the center of curvature of the run-in section and forming an acute angle with the reference line.

The invention brings about the advantage that a power chain saw equipped with the guide rail operates not only completely free of kickbacks but also enables an easy, directed plunge-in cutting with a minute power consumption and with a high cutting efficiency. If the circular run-in section spans over an angle at most 80° and has a radius which is at most a half the width of the guide rail, then an additional advantage is obtained that apart of the backstroke-free operation, the power chain saw has a higher cutting performance both in the range of the run-out section of its tip portion and in the range of its actual return-run or cutting section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
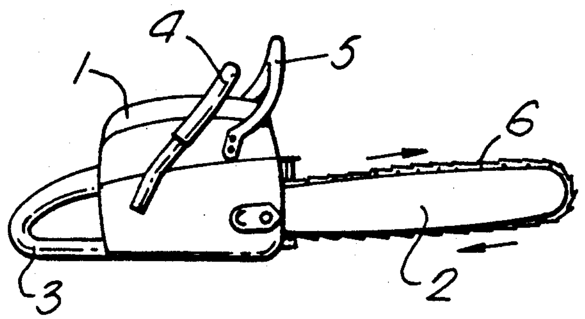
FIG. 1 shows in a plan view on a greatly reduced scale a conventional power chain saw.

A conventional power chain saw according to FIG. 1 includes a housing 1 enclosing a power drive consisting of an electric motor or of an internal combustion engine and being provided with a holding fixture for receiving a chain guide rail 2. Furthermore, the housing is provided with a rear hand grip 3, a front hand grip 4 and a hand protection shield 5. The peripheral surface of the guide rail 2 is equipped with a non-illustrated guiding groove forming a slide seat for driving links of a saw chain 6 while the chain links of the chain are slidably supported on the peripheral surface of the guide rail 2.

Figure 2:
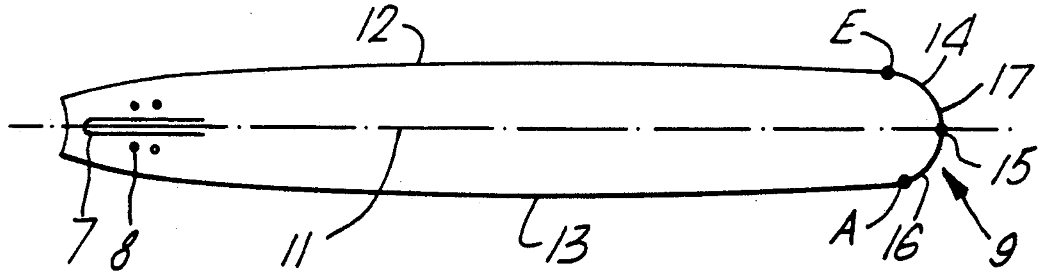
FIG. 2 is a plan view, on a reduced scale, of a prior art chain guide.

As seen from FIG. 2, the guide rail 2 has on its rear end connection elements 7 and 8 in the form of slots and holes and the like which cooperate with corresponding connection organs in the form of reception bolts and chain tension adjusters and the like in a rail holding fixture in the housing of the chain saw. At the left hand end of the chain guide mounted on the holding fixture in the housing (FIG. 1),the saw chain 6 is driven into circulation by means of a chain sprocket wheel powered by the drive to circulate in the direction of arrow indicated in FIG. 1.

The front end of the chain guide 2 of FIG. 2 has a tip section 9 along which the forward run of the saw chain 6 is deviated into the return run. The deviating process can be facilitated in a conventional way by means of a deviation chain wheel rotatably supported at the front end of the guide rail 2. The guide rail has a center axis 11 extending midway between a forward run section for guiding the chain from the rear end of the rail in the direction toward the front end of the latter; at the opposite side extends return- or cutting run section 13 for guiding the saw chain on the peripheral surface of the rail towards the rear end of the latter. The forward run section 12 transits at its end point E into a run-in section 14 situated at the same sector of the rail above the center axis 11. The run-in section gradually terminates at the foremost point of the rail, namely at the vertex 15. From the vertex extends downwardly curved run-out section 16 which also gradually turns downwards toward start point A of the cutting section 13 extending below the center axis 11. As mentioned before, all these sections are parts of the peripheral surface of the guide rail 2 serving for guiding the chain 6 whereby the vertex 15 represents the foremost point at the tip of the rail.

The most critical region with respect to the backstroke or kickback behavior of conventional power chain saws is the area indicated by reference numeral 17 in FIG. 2. This area includes substantially the entire run-in section 14, the vertex 15 and a short portion of the run-out section 16 adjoining the vertex. If the chain saw encounters in this region 17 a solid, hard object during its operation, a sudden backstroke of the saw with the corresponding large increase of power consumption cannot be avoided. This holds true even in the case of such power chain saws which in the range of the tip 9 have a relatively small radius of curvature even if the overall tendency to kickbacks of such saws is reduced. Moreover, the tendency to backstrokes depends for example, which part of the tip 9 and under which angle the tip is guided against the hard object, how large is the speed of circulation of the saw chain or how the power chain saw is held by the user.

To avoid the kickbacks it has been known (DE-GM 88 03 810) to design the run-in arc 14 in the range of the vertex 15 with radius curvature of only 10 to 30 mm and to shape the section between this vertex range and the return run 13 as a run-in inclined section of a relatively large radius of at least 150 mm and forming an angle of 10° to 40° with the center axis 11. Generally, the guide rail 2 has been designed mirror-symmetrically with respect to its longitudinal center axis, to enable its utilization at both sides and if need be to enable its mounting in the holding fixture at its opposite end.

Figure 3:
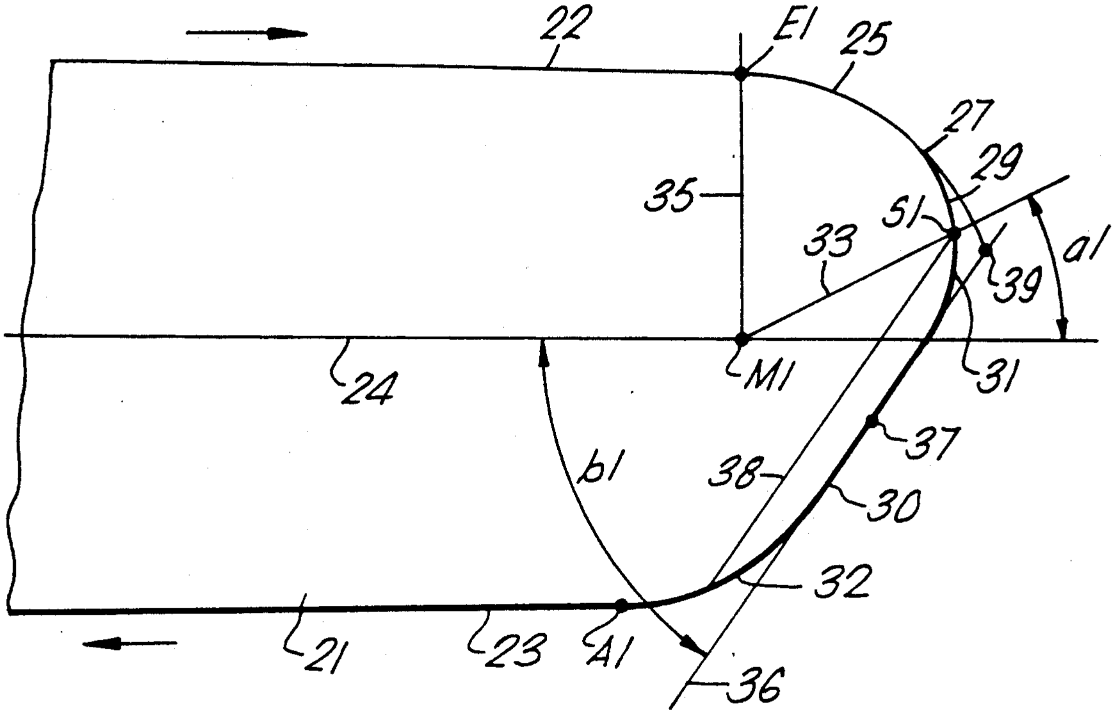
FIGS. 3 to 8 show on a scale of approximately 1:1 a front portion of different embodiments of the kickback-free, asymmetric chain guide for power chain saws according to this invention.

A front part of an embodiment of the guide rail 21 according to this invention is illustrated in FIG. 3. The remaining part of the guide rail is constructed in conventional manner. The guide rail 21 has a forward-run section 22 and a return- or cutting section 23, both extending substantially parallel at opposite sides of the center axis 24 and each having a slight convex curvature relative to the axis. The front end point El of the forward run section 22 transits into a run-in section 25 which terminates at the vertex 51. The run-in section 25 includes a circular portion terminating at the point 27 and having a fixed radius of about 37.5 mm corresponding to a half of the width of the guide rail. The circular section part transits from the pont 27 into a relatively short section 29 of a smaller radius of curvature which terminates at the vertex S1. From the vertex extends a curved run-out section 30 terminating at the start point A1 of the cutting section 23. The run-out 30 has an intermediate portion of a substantially larger radius of curvature of more 100 mm; the end portions of the section 30 define respectively a short transition part 31 or 32 of a smaller radius of curvature. The transition section 31 starts at the vertex S1 while the other transition portion 32 ends at the start point A1.

A straight line 33 connecting the vertex S1 with a base point M1 on the center axis 24 of a perpendicular to the forward run section 22 at the end point E1, forms with the center axis 24 an angle a1=26°. The magnitude of the angle a1 is decisive for the kickback-free operation of the guide rail. At a larger acute angle a1 the freedom from kickbacks of the chain saw is fully preserved. At a lower acute angle a1 the tendency to kickbacks gradually increases until at an angle a1=0 the guide rail no longer is free of kickbacks, especially in the case when the run-in section 25 of the constant radius M1E1 extends up to the center axis 24 so that the vertex S1 is situated on the center axis. Accordingly, in the range of angles a1 between about 10° up to about 80°, which the line 33 forms with the center axis 24, usable operational results of the rail of this invention are still achievable. The base point Ml is a center point of the first part of the running section 25 having a fixed radius corresponding to the line section M1E1.

For satisfactory cutting performance during a plunge-in cutting operation it has been proved to be of particular advantage when an angle b1 between the center axis 24 and the tangent line 36 at the point 37 of the run-out section 30, is between 40° and 70°. In this embodiment, the angle b1 amounts to 55° resulting in an excellent cutting performance.

In a modification of the embodiment of FIG. 3, it is possible to prolong the run-in section 25 up to a point 39 of intersection with the tangent line 36 whereby the intersection point 39 constitutes the vertex of the tip of the guide rail. Even in this modification, the smaller angle a1 should not fall below 10°. In still another modification it is possible to offset the central position of the longitudinal axis 24 such that its distance relative to the cutting section 23 is greater than relative to the forward run section 22 while the above mentioned limits of the angles a1 and b1 are preserved.

Figure 4:
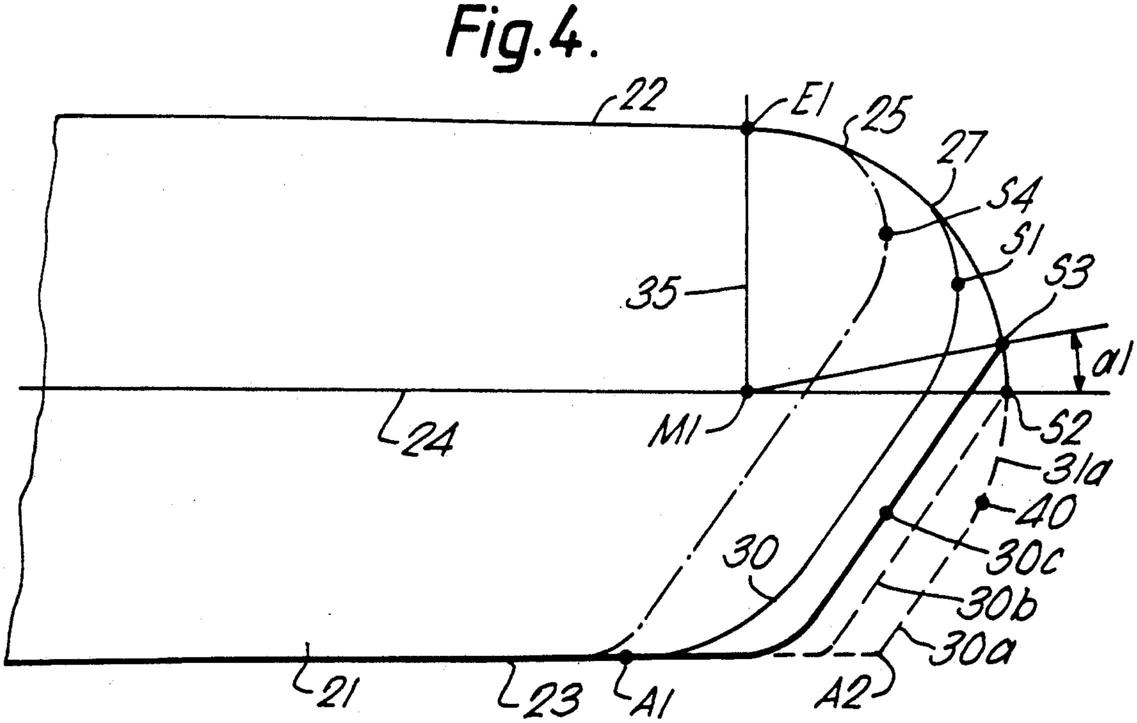

FIG. 4 shows another embodiment of the guide rail which is similar to that of FIG. 3 so that like component parts are designated by the same reference numerals. For exploratory reasons the run-in section 25 having the fixed diameter M1E1 is first illustrated to extend beyond the limits set by this invention, namely up to a vertex point S2 lying on the center axis 24. The run-out section 30*a* indicated by dashed lines includes a transition part 31*a* of the same fixed diameter M1E1 and extending up to a point 40 from which the actual run-out section of a substantially increased diameter extends up to a start point A2 of return run or cutting section 23. With this explanatory example of the guide rail, the power chain saw would be subject to strong kickbacks or backstrokes. The same tendency to backstroke would occur if the run-out section would extend along the other dashed line 30*b* and forming an angle between 40° and 70° with the center axis without the use of the transition portion 31*a*. Only when according to this invention the vertex S3 is situated above the center axis 24 and the run-out section 30*c* indicated by a full line connects the vertex S3 with the return section 23 at the same angle of 40° and 70° the tendency to kickbacks strongly recedes. If the vertex S3 according to FIG. 3 is at least 2 mm above the center axis 24 the tendency to kickbacks is practically eliminated. The distance of 2 mm corresponds to an angle a1 of 10° with guide rails having the smallest, in practice usable width.

In other words, the explanatory examples of FIG. 4 make it evident that the run-in section 25 extending from the end point E1 and having a constant radius M1E1 must end before reaching the center axis 24 and must transit into the run-out section 30 or 30*c* at a vertex S1 or S3 which lies above the center axis 24. It is permissible to design the transition part to the run-out section to extend a very short distance along a vertical line intersecting the vertex but it is preferable when the run-out section immediately starts receding to the left from the vertex point. Therefore, according to FIG. 3 in the immediate vicinity of the vertex S1 there are provided short transition sections 29 or 31 each having a minimum diameter which is still sufficient for an unobstructed circulation of the chain saw, for example a radius of maximum 15 mm. Consequently, the vertex S1 touches vertical line to the plan-parallel forward return guide surfaces of the guide rail 21, whereby the transition sections 29, 31 rapidly recedes from this contact point.

FIG. 4 also illustrates that the vertex S1 or S3 lies in a sector delimited by the center axis 24 (line M1S2), an arc having a center of curvature M1, and a radius M1E1 corresponding to a line sector 35 delimiting the run-in sector of the tip part of the guide rail. As explained before, the vertex must not lie on or below the center axis and also must not touch the line sector 35. However, other loci of the vertex S1, S3 as indicated by dash and dot line appear to be acceptable for this invention. The individual selection of the location of the vertex depends on the width of the guide rail. Preferably, the vertex within the limits of this invention is to be situated at a point which guarantees an undisturbed and backlash free circulation of the chain with a minimum friction. It is of a particular advantage when the run-in section 25 according to FIG. 3 has the shape of a spiral which tangentially starts from the end point E1 and gradually reduces its radius of curvature. Alternatively it is also possible to design the vertex S3 according to FIG. 4 as an intersection point of an arcuate convex run-in section 25 with a straight line run-out section 30*c* unless the angle of the vertex S3 is excessively sharp.

In summary, the vertex S1, S3 or S4 is in accordance with the invention situated always within the first quadrant of an arc circumscribed from the center M1 initially with a fixed radius M1E1; it is permissible to locate the vertex on the arc itself but it is not permissible to locate the vertex at the coordinates (35, 24) of the quadrant.

Of course, in the explanations of FIG. 4 it is assumed that the end E1, the vertex S and the start point A are actually narrow strips of the peripheral surface of the guide rail. In contrast, the lines 24, 33 and 35 are imaginary construction lines for defining the limits of respective forward and return run sections. For example, the statement that a vertex lies in a given arcuate section means that a vertical to the center axis contacts the arcuate sector at the vertex point. It will be understood that the peripheral surface actually includes two parallel, substantially identical guiding surfaces between which the guiding groove for the drive links of the saw chain is arranged.

Figure 5:
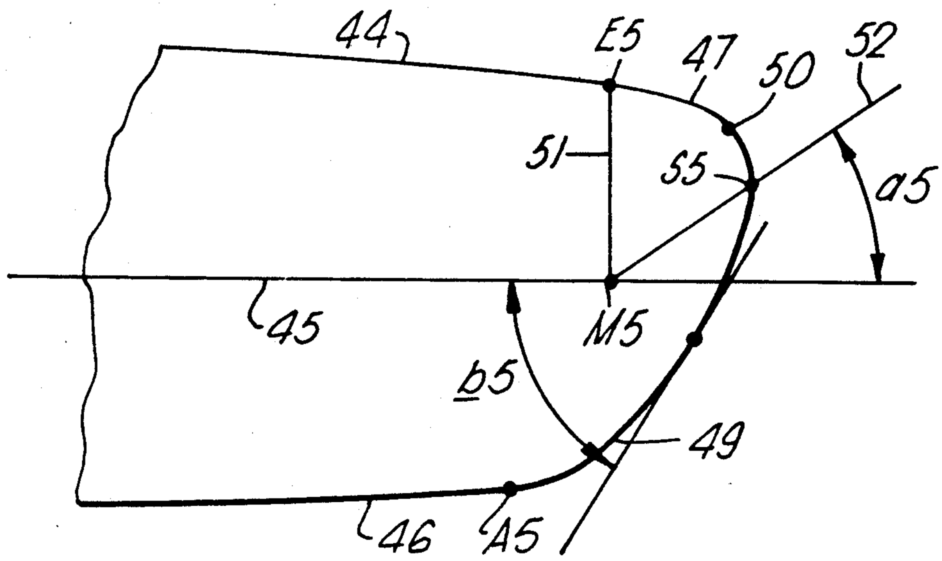

The embodiment according to FIG. 5, includes similarly as in FIG. 3, a forward run section 44, a center axis 45, a return run section 46, a run-in section 47, a vertex 55 and a run-out section 49. The fixed radius M5E5 of the run-in section 47 amounts to 25 mm up to the point 50; the part of the run-in section between the point 50 and the vertex 55 has a strongly reduced radius. The angle a5 between the center axis 45 and the line 52 is 34°. Accordingly the angle between a perpendicular 51 and the line 52 is 56°. The line 52 passes through the vertex 55 and the base M5 of the perpendicular 51 on the central axis. The angle b5 formed by the tangent line at the center of the run-out section and the center axis amounts to 58°. Such a dimensioning of the guide rail of this invention results in good cutting efficiency without any tendency to kickbacks.

Figure 6:
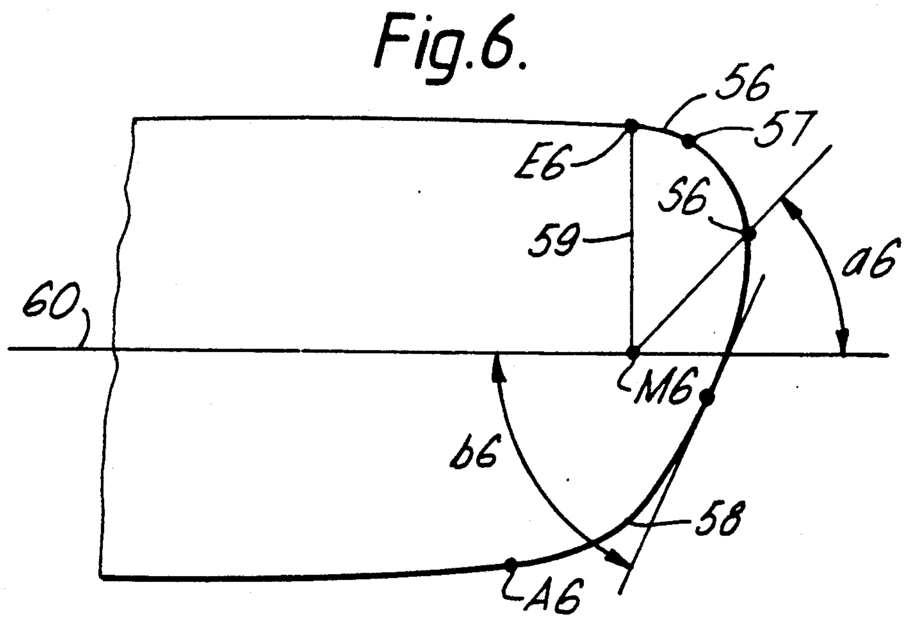

In the embodiment according to FIG. 6, similarly to FIG. 5, only the parts needed for understanding the geometry of the guide rail of this invention are designated, in particular the run-in section 56, a vertex S6, a run-out section 58 with a tangent line, and a perpendicular to the forward run section at the end point 86 and intersecting the center axis 60. In this example the fixed radius M6E6 is about 30 mm, the angle a6 is about 45° and the angle b6 is about 64°. The part of the run-in section 56 having the fixed radius M6E6 extends only over very short distance from the end point E6 to the point 57 wherefrom a spiral-shaped transition part of the run-in section having a continuously larger curvature begins. The vertex S6 defined by this transition part is therefore situated relatively high above the center axis 60.

Figure 7:
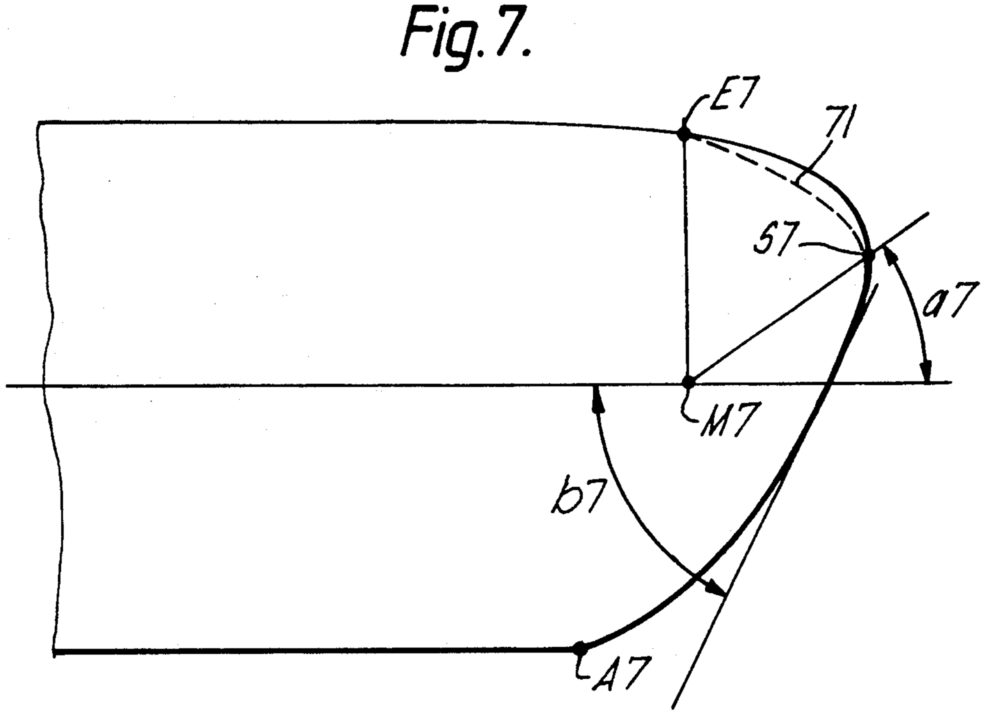

The embodiment according to FIG. 7 corresponds substantially to that of FIG. 3 with the difference that the angle a7 is about 36° and the angle b7 is about 63°. Also the width of the guide rail is 75 mm instead of 60 mm. The guide rail according to FIG. 8, which embodiment has so far been found the most advantageous in operation, has the width of about 60 mm, the angle a8 is about 50°, the angle b8 is about 49° and the fixed radius M8E8 of the run-in section 61 is about 20 mm. At the vertex S8 the run-in section 61 intersects the run-out section 63 without any transitional or coupling rounding similar to coupling sections 29 or 31 in the embodiment of FIG. 3.

Figure 8:
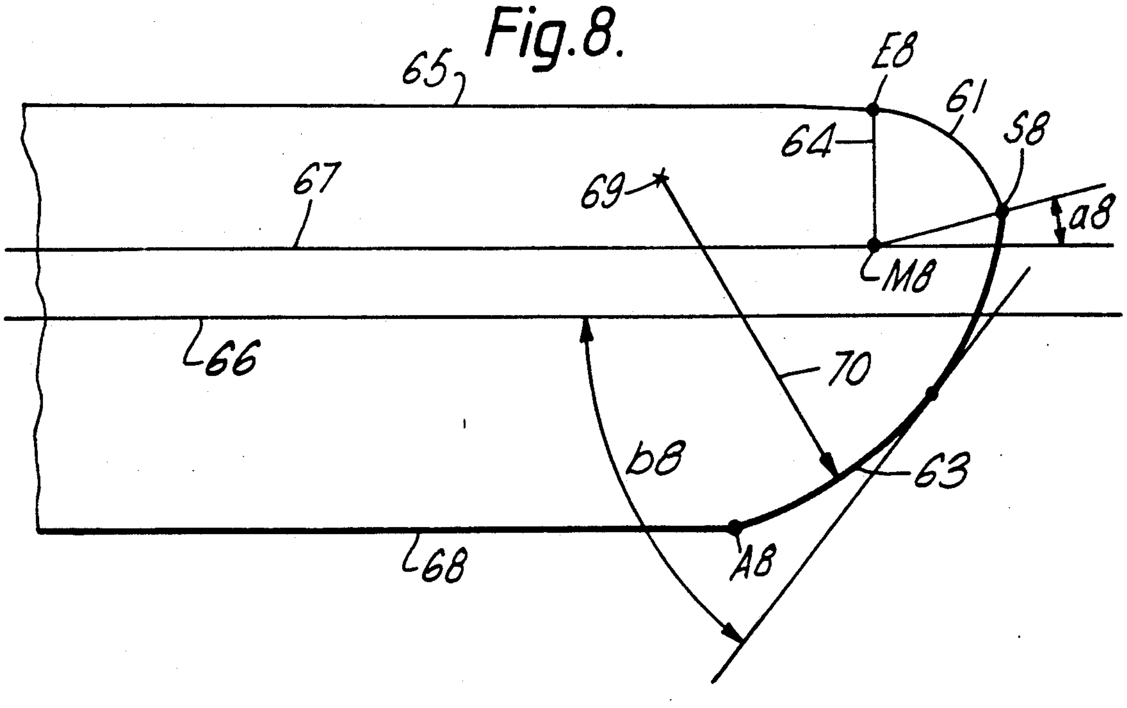

An essential difference between the guide rails of FIGS. 3 to 7 and the guide rail of FIG. 8 resides in the fact that the run-in section 61 is more curved that is having a smaller radius of curvature than in the former embodiments where the radius of curvature corresponds to the half width of the rail. The base point M8 of a perpendicular 64 from the end point E8 on the forward run section 65 in the embodiment of FIG. 8 does not lie on the center axis 66 of the rail but is situated on a reference line 67 extending parallel to the center axis 66 below the forward run section 65. As mentioned before, the run-in section 61 having the fixed radius of curvature M8E8 extends continuously from the point E8 to the vertex S8 which lies above the parallel reference line 67. If the run-in section 61 be extended up to the parallel line 67 that means forming an arc center angle 90°, the resulting guide rail similarly as explained in the example of FIG. 4, would have the tendency to kickbacks. Therefore, the run-in section 61 according to the invention is permitted to have a length of arc corresponding to a center angle of about 80° starting at the perpendicular 64 so that the angle a8 is about 10° and consequently the vertex S8 has a sufficient distance above the parallel reference line 67 so that no backstrokes or kickbacks would occur. Alternatively, it would be also possible to round off the point in the range of the vertex S8 provided that a possible displacement of the vertex S8 due to the rounding does not exceed the limit of at least 2 mm above the parallel reference line 67. In particular, in this case the vertex S8 in correspondence with FIG. 4 must lie within a circle sector delimited by the vertical line 64, the parallel reference line 67 and an arc with a radius M8E8.

In a modification, the parallel reference line 67 could in theory be also located between the center axis 66 and the return run 68. It is evident however that with the above values for the angle b8 the run-out section 63 would become too short and consequently the guide rail would be less suitable for the plunge-cutting work.

The center point 69 of curvature of the run-out section 63 having radius of curvature indicated by line 70 lies in this embodiment above the parallel reference line 67 so that the run-out section 63 recedes from the vertex S8 at an angle which deviates by 90° which feature is particularly advantageous with respect to the elimination of backstrokes. With the embodiment of the guide rail according to FIG. 8, excellent cutting performance, particularly during a plunge-cutting operation has been achieved. No tendency to backstroke has been experienced.

The present invention is not limited to the details of the above described embodiments, since various modifications and changes may be made without departing from this invention. For example it has been found to be of advantage when the vertex is at such a distance from the center axis of the guide rail corresponding to a sixth or even to a quarter of the width of the guide rail (FIGS. 6 through 8, for example). The vertex should lie the higher from the enter axis the larger is the radius of curvature of the run-in section or the wider is the guide rail. By this measure a length of the run-out section within the above described angular range is obtained which is advantageous for the plunge-cutting work with a guide rail of a given width. In addition, to obtain a high cutting efficiency, at least a part of the run-out section should have a radius of curvature of more than 80 mm and the tangent line at the center point of this part should form with the center axis an angle between 40° to 70°. It is also frequently of advantage when the center of curvature of the arc extending between the forward run and the parallel reference line is situated outside the contour of the guide rail.

The above described dimensions are variable within broad limits and in individual cases can be modified according to this invention to meet individual operational needs. In general it can be summed up that small radii of curvature of the run-in section reduce the tendency of kickbacks and therefore can be combined with very small angles a1 through a8. On the other hand, if larger radii of curvature are to be employed in the run-in section it appears to be of advantage when the angle a1 through a8 are also increased or the length of the run-in section is reduced. It has been found out that with larger radii of curvature, for example from 40 mm, it was difficult to avoid the tendency to kickbacks when simultaneously a satisfactory cutting performance during plunge-cutting operation was required. Therefore, the run-in section irrespective of its contour, should not have at any point a radius of curvature which is larger than 40 mm.

Similarly, the dimensions given by way of example for the run-out section can be also optimized experimentally for a particular application. It will be understood that the dimensions and ratios given in the examples of preferred embodiments are valid only for conventional commercially available chain guides of standard width. When using guide rails having non-standard width, the dimensions must be adjusted accordingly. As mentioned before, the run-out section can have a slightly concave contour with respect to the center axis and its end portions can be provided with short convex coupling or transition sections leading respectively to the vertex or to the start point of the return section.

The forward-run section and the return-run section can have a straight configuration or a slightly concave (FIG. 2) or a slightly convex curvature with respect to the center axis. It is also possible to provide the forward-run section prior to its end point E1 through E8 with an introductory slope (DE-GM 88 03 810) which forms with the center axis an angle between 10° to 40° and has a radius of curvature of at least 150 mm. Preferably such introductory slopes are relatively short or the outer contours of peripheral sections of the rail adjoining the run-in and run-out sections have their conventional commercially available shape and the run-in section adjoins immediately the forward-run sections to create the desirable space for the run-out section such as to enhance the plunge-in cutting operation.

It is not necessary to join the run-in section exactly tangentially to the end of the forward section. Moreover, as indicated by dashed line 21 in FIG. 7, it is possible to direct the run-in section at angle from the end point E7 of the forward-run section such that a corner is formed at the end point E7.

It will be also understood that the arrangements of run-in and run-out sections according to the embodiments of FIGS. 3 to 8 can be mutually combined and interchanged in an arbitrary manner.

The invention brings about the advantage that also with the use of run-in sections having at least partially relatively large radii of curvature the kickbacks of the chain saw are reliably eliminated while maintaining relatively long run-out sections which feature leads to an effective plunge-cutting operation. In practice, the guide rail designed in accordance with the embodiments of FIGS. 3 to 8 have been found as particularly advantageous.

Contrary to conventional guide rails the above described guide rails of this invention can be assembled and driven in the way only that the saw chain circulates in the direction of arrow indicated in FIGS. 1 and 3. In order to prevent an incorrect (reversed) installation of the guide rail in the holding fixture of the housing 1 (FIG. 1), the connecting elements 7, 8 (FIG. 2) or the corresponding coupling organs in the holding fixture are preferably designed such as to allow the connection of the guide rail in the correct position only. In addition, the run-in section of the rail according to FIGS. 3 to 8 is preferably slightly convex with respect to the center axis. As mentioned before however this does not preclude other curved shapes differing from the illustrated ones. Especially in the range adjoining the end of the forward-run section it is possible to use concave or wave-shaped contours of an arc provided of course that they do not impair the circulation of the chain.

What is claimed as new and desired to be protected by Letters Patent is set forth in the appended claims:

1. A chain guide for a motor-driven chain saw, comprising an elongated rail defining a rear portion, an intermediate portion and a front portion, a longitudinal axis (24) and a peripheral surface for slidably supporting a saw chain, the rear portion being provided with attachment elements (7, 8) engageable with a holding fixture in a housing of the chain saw, the peripheral guiding surface having a forward-run section (22) extending in an upper part of the intermediate portion substantially parallel to said axis (24) and terminating at an end point (E1) at a first distance from said axis, a return-run or cutting section (21) extending from a start point (A1) at a second distance from said axis (24) in a lower part of the intermediate portion substantially parallel to said axis, and an arcuate tip section including a run-in section (25) starting at the end point (E1) and terminating at a vertex point (S1) above said axis and an arcuate run-out section (30) starting at the vertex point (S1) and terminating at the start point (A1) of the cutting section (21), wherein said vertex point (S1) is located within an imaginary sector which substantially is defined by said axis (24), a line (35) perpendicular to said axis (24) and running through said end point (E1), a point (M1) of intersection between said axis (24) and said line (35) perpendicular thereto, and an imaginary circular curve having a center of curvature and a radius, said center of curvature coinciding with said point (M1) of intersection and said radius corresponding to said first distance.

2. A chain guide as defined in claim 1, wherein said vertex (S1) is at least 2 mm above said axis (24).

3. A chain guide as defined in claim 1, wherein said axis (24, 66) and an imaginary line running through said point (M1, M8) of intersection and said vertex (S1, S8) form an angle (a1, a8) between 10° and 80°.

4. A chain guide as defined in claim 1, wherein said vertex (S1) is situated at a distance from said axis (24) which amounts to at least a sixth of the rail width.

5. A chain guide as defined in claim 1, wherein said radius at any point of said run-in section (25, 61) is at most 40 mm.

6. A chain guide as defined in claim 1, wherein said run-in section (25, 61) is continuously connected with said forward-run section (22, 65).

7. A chain guide as defined in claim 1, wherein said run-in section (25) when viewed from said end point (E1) of the forward section (22) up to the vertex (S1) has a gradually decreasing radius of its curvature.

8. A chain guide as defined in claim 1, wherein an end portion of said forward-run section (22, 65) adjoining said end point (E1, E8) has a radius of curvature of at least 150 mm.

9. A chain guide as defined in claim 1, wherein at least a part of said run-out section (30) has a convex shape with a radius of curvature of at least 45 mm and having short coupling parts (31, 32) with smaller radius of curvature to form respectively short coupling or transition sections adjoining the vertex (S1) or the start point (A1).

10. A chain guide as defined in claim 1, wherein an imaginary tangent line of a mid point (37) of said run-out section (3) forms with said axis (24) an angle between 40° and 70°.

11. A chain guide as defined in claim 1, wherein said run-out section (30, 63) is continuously connected with said vertex (S1, S8).

12. A chain guide as defined in claim 1, wherein said run-in section (61) and said run-out section (63) form an angle at said vertex (S8).

13. A chain guide as defined in claim 1, wherein said run-out section (63) has a circular curvature, said curvature having a center (69) of curvature and said center of curvature being situated between said axis or said parallel (67) and said forward-run section (65).

14. A chain guide for a motor-driven chain saw, comprising an elongated rail defining a rear portion, an intermediate portion and a front portion, a longitudinal axis (66) and a peripheral surface for slidably supporting a saw chain, the rear portion being provided with attachment elements (7, 8) engageable with a holding fixture in a housing of the chain saw, the peripheral guiding surface having a forward-run section (65) extending in an upper part of the intermediate portion substantially parallel to said axis (66) and terminating at an end point (E8), a return-run or cutting section (68) extending from a start point (A8) in a lower part of the intermediate portion substantially parallel to said axis (66), and an arcuate tip section including a run-in section (61) starting at the end point (E8) and terminating at a vertex point (S8) and an arcuate run-out section (63) starting at the vertex point (S8) and terminating at the start point (A8) of the cutting section (68), wherein said vertex point (S8) is located above an imaginary parallel (67) to said axis (66), said parallel (67) being at a third distance to said end point (E8), and within an imaginary sector which substantially is defined by said parallel (67), a line (64) perpendicular to said parallel (67) and running through said end point (E8), a point (M8) of intersection between said parallel (67) and said line (64) perpendicular thereto, and an imaginary circular curve having a center of curvature and a radius, said center of curvature coinciding with said point (M8) of intersection and said radius corresponding to said third distance.

15. A chain guide as defined in claim 14, wherein said vertex (S8) is at least 2 mm above said parallel (67).

16. A chain guide as defined in claim 14, wherein said axis (24, 66) and an imaginary line running through said point (M1, M8) of intersection and said vertex (S1, S8) form an angle (a1, a8) between 10° and 80°.

17. A chain guide as defined in claim 14, wherein said parallel (67) is situated between said axis (66) and said forward-run section (65).

18. A chain guide as defined in claim 14, wherein said radius at any point of said run-in section (25, 61) is at most 40 mm.

19. A chain guide as defined in claim 14, wherein said run-in section (25, 61) is continuously connected with said forward-run section (22, 65).

20. A chain guide as defined in claim 14, wherein said run-in section (25) when viewed from said end point (E1) of the forward section (22) up to the vertex (S1) has a gradually decreasing radius of its curvature.

21. A chain guide as defined in claim 14, wherein an end portion of said forward-run section (22, 65) adjoining said end point (E1, E8) has a radius of curvature of at least 150 mm.

22. A chain guide as defined in claim 14, wherein at least a part of said run-out section (30) has a convex shape with a radius of curvature of at least 45 mm and having short coupling parts (31, 32) with smaller radius of curvature to form respectively short coupling or transition sections adjoining the vertex (S1) or the start point (A1).

23. A chain guide as defined in claim 14, wherein an imaginary tangent line of a mid point (37) of said run-out section (30) forms with said axis (24) an angle between 40° and 70°.

24. A chain guide as defined in claim 14, wherein said run-out section (30, 63) is continuously connected with said vertex (S1, S8).

25. A chain guide as defined in claim 14, wherein said run-in section (61) and said run-out section (63) form an angle at said vertex (S8).

26. A chain guide as defined in claim 14, wherein said run-out section (63) has a circular curvature, said curvature having a center (69) of curvature and said center of curvature being situated between said axis or said parallel (67) and said forward-run section (65).

* * * * *